3,384,509
PAPER COATED WITH REACTION PRODUCT OF ESTER RESIN WITH AMINE-ALDEHYDE RESIN

Daniel Dickerson Ritson, Riverside, and Ralph Earl Layman, Jr., Stamford, Conn., assignors to American Cyanamid Company, Stamford, Conn., a corporation of Maine
No Drawing. Filed Sept. 8, 1964, Ser. No. 395,017
10 Claims. (Cl. 117—155)

ABSTRACT OF THE DISCLOSURE

The invention provides paper which carries a glossy grease-resistant coating and which is suitable for use as restaurant menus and mechanics' instruction manuals. The coating is a reaction product of a toluene-soluble water-insoluble substantially neutral branched chain polyhydroxy phthalic anhydride-dimerized unsaturated higher fatty acid-glycol-polyol ester resin and 40 to 10 parts by weight as anti-blocking agent of a toluene-soluble thermosetting alkylated amino-formaldehyde resin.

---

The present invention relates to water-laid cellulose webs carrying a flexible, glossy, non-blocking grease- and water-impermeable coating on at least one side.

In the present specification the term "water-laid cellulose web" includes paper, paperboard, cardboard, hardboard and wallboard.

The manufacture of water-laid cellulose webs which carry a flexible, glossy, non-blocking grease- and water-impermeable coating on at least one of their sides is an important and growing specialty of the paper-making art. Webs carrying a coating of this description are commonly used for the packaging of fatty and moist foods, for printing restaurant menus and mechanics' instruction manuals, as display cards, etc.

Coatings suitable for such uses must be flexible, yet resins which are flexible often achieve this property as the result of being undercured, so that they are tacky and not water- or grease-resistant. Moreover, coatings which are resistant to penetration by grease and water often achieve these properties from a high state of polymerization, so that they are brittle.

The discovery has now been made that cellulose webs coated on at least one side with a composition consisting essentially of the reaction product of a toluene-soluble water-insoluble branched-chain substantially neutral polyhydroxy phthalic anhydride-dimerized unsaturated higher fatty acid-glycol-glycerol ester resin with a minor amount of a toluene-soluble, thermosetting, alkylated amino-formaldehyde resin possess the above-described combination of properties. We have further found that the reaction of the polyhydroxy ester resin with the amino-formaldehyde resin to the stage where it is flexible, non-blocking and grease- and water-resistant proceeds sufficiently rapidly in the presence of a suitable catalyst, that the resin is suitable for practical use in the manufacture of paper and other cellulose products.

The coated cellulose webs of the present invention possess the following properties.

(1) They possess very satisfactory resistance to penetration by oil and water at room temperature. The products are thus suitable for use as a general purpose packaging material for moisture-containing fatty food or greased machine parts.

(2) Paper coated in accordance with the present invention is flexible. It can be creased without causing the coating to crack.

(3) The coating is non-blocking when stored at summer temperatures under pressure in contact with itself.

(4) The coating, unless otherwise desired, is glossy and transparent.

The coating may contain other materials which are customarily present in resinous paper coatings. Thus the coating may contain a pigment, for example titanium dioxide white, phthalocyanine blue, or carbon black, an oil-soluble non-reactive dye, or an ultra-violet light absorber. The coating may be composed of interreacted mixtures of ester resins and mixtures of amino-formaldehyde resins of the type described.

The product of the present invention is made by coating a dry water-laid cellulose web with a solution of the ester resin (or mixture of ester resins), the amino-formaldehyde resin (or mixture of amino-formaldehyde resins), and an acid catalyst in a volatile organic liquid. The organic liquid may be any material which is a solvent for the three components; the preferred solvents have low boiling points. Benzene, toluene, xylene, methyl acetate, ethyl acetate and acetone in general are suitable.

The solids:solvent ratio in the coating composition is such as to produce a solution of normal coating viscosity in view of the particular coating apparatus employed, the speed of travel of the web during the coating step, and the pick resistance of the web. It is a feature of the process of the present invention that a coating solution containing 65% by weight of the aforementioned resins is entirely practical for the coating of paper, both as to viscosity and as to speed of cure. The operativeness of a coating solution of such high solids content or conversely of such low solvent content minimizes both the depth of penetration of the composition into the web and the amount of solvent employed per unit weight of film-forming material which must be evaporated and shortens the time required for drying the web and thermoconversion of the resinifying components of the coating.

The web is dried at any convenient temperature at which the solvent evaporates and the ester resin and the amino-formaldehyde resin co-react. With toluene (boiling point 111° C.) as the solvent, a suitable method is to pass the paper through an air oven having an operating temperature of 250° F. or a closed radiant heating oven (to permit recovery of the solvent), the dwell time of the paper in the oven being regulated so that the reaction produces a coating which is in non-blocking but flexible state. With preferred resinous mixtures the reaction goes to this state under these conditions in less than 1 minute, at an acceptably low temperature.

A variety of suitable ester resins and amino-formaldehyde resins are known for the manufacture of paper of the present invention.

Suitable ester resins and reagents therefor are disclosed in Simon et al. U.S. Patent No. 2,802,795 (1957), Young U.S. Patent No. 2,954,354, and copending application Ser. No. 74,792 filed by R. E. Layman on Dec. 9, 1960, now U.S. Patent No. 3,158,584. The resins are made in general by reacting a phthalic acid or anhydride and a higher dimerized ethylenically unsaturated fatty acid with a glycol and polyol containing 3 or more hydroxy groups.

In the preparation of these resins the phthalic acid or anhydride (which may be o-, m-, or p-phthalic acid, tetrahydrophthalic acid, endomethylenetetrahydrophthalic acid, or chlorophthalic anhydride) is the principal esterifying acid; the dimerized substituted higher fatty acid (which may be dimerized geranic acid, dimerized palmitolic acid, dimerized linoleic acid, or dimerized humoceric acid) is present in comparatively minor amount as flexibilizing agent. A small amount of a simple acid such as fumaric acid may be present; this acid improves the color and hardness of the resin. Preferably the amount of this acid is 1% to 10% of the weight of the phthalic anhydride or acid.

The glycol is the principal component with which the acids react; suitable glycols include ethylene glycol, 1,3-propanediol, 1,5-pentanediol, 1,6-hexanediol, diethylene glycol, butylene glycol, and glyceryl monoacetate.

The polyol is present in comparatively minor amount, as branching agent. Suitable polyols include glycerol, trimethylol ethane, trimethylol propane, 1,2,6-hexanetriol, and erythritol.

The polyol may be omitted if desired and may be replaced by a correspondingly small proportion of a polycarboxylic acid, for example, tricarballic acid or a trimer of an ethylenically unsaturated fatty acid.

The resulting resin is diluted to flowable viscosity with a volatile solvent. In general, the ratio of the number of the esterifying carboxy groups of the acids to the number of esterifiable hydroxy groups of the glycol plus the number of esterifiable groups of the polyol is such that when the acids have substantially all reacted and an ester having a molecular weight in the range of 2,000–10,000 and preferably having an acid number of 5 to 10 (so that it is substantially neutral) is obtained, the polymeric macromolecules will contain a sufficient number of etherifiable hydroxyl groups to react with an alkylated amino-formaldehyde resin and thereby convert to insoluble state. The particular acids and alcohols employed are selected so that the resin is toluene-soluble but is insoluble in water.

The thermosetting alkylated amino-formaldehyde component is prepared by reacting a suitable amino compound (for example urea, thiourea, biuret, dicyandiamide, melamine, formoguanamine and acetoguanamine or mixture thereof) with sufficient formaldehyde to form a thermo-setting product, and sufficient of a lower alkanol or mixture of alkanols (preferably propanol or butanol) to form a toluene-soluble product. The desired amino compound (or mixture of amino compounds) is reacted in known manner with the necessary amount of aqueous formalin and the desired lower alkanol (or mixture of alkanols) until a thermosetting material is obtained after which the water is stripped off (if desired, by azeotropic distillation with xylene).

Sufficient of the alkylated amino-aldehyde resin and an acid catalyst are added to the ester resin solution so that the resulting composition, when dried at customary temperatures (generally 250° to 300° F.), is hard and non-tacky. In general, it is preferable to add more of the amino resin than is theoretically equivalent to the ester resin, so as to ensure that substantially all of the hydroxyl groups of the ester resin pass into the reacted state when the composition is cured, and as a rule of thumb good results are generally obtained when the weight ratio of the ester resin to the amino-formaldehyde resin is about 80:20. The curing reaction is a trans-etherification and the alkanol used to alkylate the amino-aldehyde condensation product is evolved when the wet coated paper is dried.

Solvent is then added or removed to adjust the composition to a suitable coating viscosity in view of contemplated application conditions. The composition is then ready for use.

The invention is further illustrated by the examples which follow. These examples are preferred embodiments of the invention and are not to be construed as limitations thereon. Percentages are by weight unless otherwise stated.

EXAMPLE 1

The following illustrates the manufacture of paper coated with a flexible but non-blocking reaction product of a solvent-soluble substantially neutral polyhydroxy phthalic anhydride-dimerized unsaturated higher fatty acid-glycol-glycerol ester resin and a minor amount as antiblocking agent of a toluene-soluble thermosetting amine-aldehyde resin compatible therewith, and also illustrates the grease- and water-resistance of the resulting paper.

A phthalic anhydride-fumaric acid-dimerized linoleic acid-ethylene glycol-propylene glycol-trimethylol ethane resin is prepared as follows:

A mixture of 177.5 g. of phthalic anhydride, 5.5 g. of fumaric acid, 75 g. of a mixture composed of 76% of dimerized linoleic acid, 23% of a $C_{54}$ tribasic acid and 1% of stearic acid (Empol 1024 of Emery Industries), 44.8 g. of ethylene glycol, 49.7 g. of propylene glycol, 25.0 g. of trimethylol ethane, 0.3 g. of triphenyl phosphite, and a drop of 1% silicone antifoam is heated slowly to 225° C. and held at that temperature until a resin is formed which has an acid number between 4 and 5 and a viscosity of $Z_1+$ as a solution of 65 parts of resin in 35 parts of xylene at 25° C.

To 128 g. of the above-described 65% by weight solution of the resin is added 27.5 g. of a 60% solution of a butylated urea-formaldehyde resin (1,2-dibutoxy-methyl urea) in xylene and 1.6 g. of a 20% by weight solution of p-toluene-sulfonic acid in isopropanol as catalyst.

The resulting solution is cut to 60% solids by addition of xylene and is coated upon coating rawstock paper at a coating weight (solids basis) of 2 lbs. per 1,000 ft.² The resulting paper is dried and cured for 1 minute at 300° F. The resulting paper carries a hard, clear, glossy flexible resin coating which is resistant to penetration by water and by grease and which does not block when stored for 16 hours at 65.5° C. under a weight of 1 lb./inch.²

The water-resistance of the coating is determined by the Cobb test, by weighing a sample of the paper, applying water to the coated side at room temperature for 15 minutes, wiping off the water, and re-weighing. No gain in weight is observed, showing that the coating is water-resistant.

The grease resistance of the coating is determined by Tappi method–T–454m–60, wherein cones of sand are formed on the coated surface, the cones are saturated with turpentine (dyed red), after 8 hours the sand is removed, and the coating is observed for evidence of penetration by the turpentine. No penetration is observed, showing that the coating is grease-resistant.

EXAMPLE 2

The following illustrates the speed with which the paper of the present invention can be manufactured.

The procedure of Example 1 is repeated except that the coating is dried and the resin is cured by placing the wet coated paper in a laboratory drying oven for the following periods of time. The temperatures shown in each instance are the temperatures of the oven before opening the door and introduction of the sample. The tendency of the coating to "block" is an index of the rate of cure of the coating.

| Run No. | Oven Temp., ° F. | Minutes in Oven | Amt. of Blocking [1] |
| --- | --- | --- | --- |
| 1 | 300 | ½ | None. |
| 2 | 275 | 1 | Do. |
| 3 | 250 | 1 | Slight. |
| 4 | 250 | 3 | None. |

[1] After 16 hours of storage at 65° C. under a pressure of 1 lb./inch.²

The results show that the resin is cured to flexible yet non-blocking state within ½ minute at 300° F.

EXAMPLE 3

The procedure of Example 1 is repeated except that the butylated urea-formaldehyde resin solution is replaced by 30 g. of a 60% tetramethoxymethyl benzoguanamine resin.

The properties of the cured coated paper are substantially the same as the properties of the cured coated paper of Example 1.

EXAMPLE 4

The procedure of Example 1 is repeated except that the butylated urea-formaldehyde resin is replaced by 16.5 g. of hexakis(methoxymethyl)melamine.

The properties of the cured coated paper are substantially the same as the properties of the cured coated paper of Example 1.

EXAMPLE 5

The following illustrates the manufacture of paper coated with the reaction product of a solvent-soluble substantially water-insoluble tetrahydrophthalic anhydride-dimerized linoleic acid- pentanediol-trimethylol resin and a minor amount of a solvent-soluble thermosetting melamine-formaldehyde resin.

A mixture of 1900 g. of tetrahydrophthalic anhydride, 750 g. of the dimerized linoleic acid-tribasic acid-stearic acid mixture of Example 1, 1430 g. of 1.5-pentanediol and 200 g. of trimethylol ethane under a nitrogen blanket is heated slowly to 160° C., maintained at 160° C. for 1 hour, slowly heated to 225° C., and maintained at 225° C. to an acid number of 5, 10 to 20 hours being required for the mixture to reach this point. The batch is cooled and 5810 g. of toluene added. To 80 g. of the resulting 40% by weight solution of the resin is added 20 g. of a 40% by weight solution of hexakis(methoxymethyl)melamine and 4% (based on the weight of resin solids) of p-toluenesulfonic acid in isopropanol.

The resulting resin solution is vacuum concentrated at room temperature to coating viscosity (approximately 60% solids) and is coated upon paper as shown in Example 1 and the paper is cured for 1 minute in an oven at 375° F. The properties of the resulting paper are substantially those of the paper of Example 1.

We claim:
1. A water-laid cellulose web coated on at least one side with a flexible, glossy, non-blocking, and grease- and water-impermeable composition consisting essentially of a reaction product of 60 to 90 parts by weight of a toluene-soluble water-insoluble substantially neutral branched chain polyhydroxy phthalic anhydride-dimerized unsaturated higher fatty acid-glycol-polyol ester resin and 40 to 10 parts by weight as anti-blocking agent of a toluene-soluble thermo-setting alkylated amino-formaldehyde resin.

2. A coated water-laid cellulose web according to claim 1 wherein the weight ratio of the ester resin to the amino-formaldehyde resin is 80:20.

3. A coated water-laid cellulose web according to claim 1 wherein the acid number of the ester resin is between 5 and 10.

4. A coated water-laid cellulose web according to claim 1 wherein the ester resin is a polyhydroxy phthalic anhydride-dimerized linoleic acid-ethylene glycol-propylene glycol-trimethylol ethane resin.

5. A coated water-laid cellulose web according to claim 1 wherein the ester resin is a substantially neutral polyhydroxy phthalic anhydride-fumaric acid-dimerized linoleic acid-propylene-glycol-trimethylol ethane ester resin wherein the weight of fumaric acid is between 1% and 10% of the weight of the phthalic anhydride.

6. A coated water-laid cellulose web according to claim 1 wherein the ester resin is a tetrahydrophthalic anhydride-dimerized linoleic acid-1,5-pentanediol-trimethylol ethane resin.

7. A coated water-laid cellulose web according to claim 1 wherein the amino-formaldehyde resin is tetramethoxymethyl benzoguanamine.

8. A coated water-laid cellulose web according to claim 1 wherein the amino-formaldehyde resin is hexakis(methoxymethyl)melamine.

9. A coated water-laid cellulose web according to claim 1 wherein the amino-formaldehyde resin is 1,2-di(butoxymethyl)urea.

10. Process for the manufacture of a water-laid cellulose web coated on at least one side with a flexible, glossy, non-blocking, grease- and water-impermeable composition, which comprises coating at least one side of said web with a mixture consisting essentially of 60 to 90 parts by weight of a toluene-soluble water-insoluble substantially neutral branched chain polyhydroxy phthalic anhydride dimerized unsaturated higher fatty acid-glycol-glycerol ester resin, and 40 to 10 parts by weight as anti-blocking agent of a toluene-soluble thermo-setting alkylated amino-formaldehyde resin and a non-volatile acid as catalyst, as a solution of coating viscosity in a volatile organic liquid, and heating said solution on said web at a temperature in excess of 100° C. for less than 3 minutes until said ester resin and said amino-formaldehyde resin co-react to flexible but non-blocking state.

References Cited

UNITED STATES PATENTS

| | | | |
|---|---|---|---|
| 2,802,795 | 8/1957 | Simon et al. | 260—22 X |
| 2,915,418 | 12/1959 | Wolfrom | 117—161 X |
| 2,954,354 | 9/1960 | Young | 260—22 |
| 2,954,355 | 9/1960 | Young et al. | 260—22 |
| 2,957,835 | 10/1960 | Culbertson et al. | 260—21 |
| 2,980,636 | 4/1961 | Culbertson et al. | 260—67.6 X |
| 2,980,637 | 4/1961 | Culbertson et al. | 260—21 |
| 3,056,755 | 10/1962 | Culbertson et al. | 260—67.6 X |
| 3,015,578 | 1/1962 | Ritson | 117—155 X |
| 3,133,032 | 5/1964 | Jen et al. | 260—21 |
| 3,158,584 | 11/1964 | Layman | 260—22 |
| 3,242,119 | 3/1966 | Ott et al. | 117—161 |

WILLIAM D. MARTIN, *Primary Examiner.*

M. LUSIGNAN, *Assistant Examiner.*